Patented May 7, 1935

2,000,348

UNITED STATES PATENT OFFICE 2,000,348

VAT DYESTUFF OF THE ANTHRAQUINONE SERIES

Heinrich Neresheimer, Wilhelm Ruppel, and Anton Vilsmeier, Ludwigshafen-on-the-Rhine, Germany, assignors to General Aniline Works, Inc., New York, N. Y., a corporation of Delaware No Drawing. Application June 20, 1932, Serial No. 618,342. In Germany June 25, 1931

7 Claims. (Cl. 260—60)

The present invention relates to new vat dyestuffs of the anthraquinone series.

We have found that vat dyestuffs of the anthraquinone series having very good properties as regards fastness are obtained by preparing, by any convenient methods, acylaminoanthraquinones in which at least one acyl radicle is a 1,2-benzanthraquinone-Bz-carboxylic acid radicle. The 1,2-benzanthraquinone-Bz-carboxylic acids used according to our invention have the following structure:

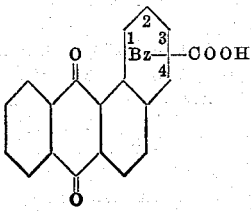

Dyestuffs which are derived on the one hand from 1,2-benzanthraquinone-Bz4-carboxylic acid and on the other hand from 1,5- or 1,8-diaminoanthraquinones are especially valuable.

The preparation of the said dyestuffs may be effected by different methods. Thus for example one and the same yellow dyestuff very fast to light is obtained by causing 2 molecular proportions of 1,2-benzanthraquinone-Bz4-carboxylic acid chloride to react with 1 molecular proportion of 1,5-diaminoanthraquinone, or 2 molecular proportions of 1,2-benzanthraquinone-Bz4-carboxylic acid amide with 1 molecular proportion of 1,5-dichloranthraquinone, or 1 molecular proportion of 1-amino-(1,2-benzanthraquinone-Bz4-carboxyl)-5-aminoanthraquinone with 1 molecular proportion of 1,2-benzanthraquinone-Bz4-carboxylic acid chloride or 1 molecular proportion of 1-chlor-(1,2-benzanthraquinone-Bz4-carboxyl)-5-aminoanthraquinone with 1 molecular proportion of 1,2-benzanthraquinone-Bz4-carboxylic acid amide. The latter compound may be prepared by saponifying Bz4-cyan-1,2-benzanthraquinone by means of 96 per cent sulphuric acid at about 90° C.

The dyestuffs in which only one amino group of the 1,5- or 1,8-diaminoanthraquinone bears the 1,2-benzanthraquinone-Bz4-carboxylic acid radicle while the other amino group is acylated by another acid radicle having similar valuable properties.

The following examples will further illustrate the nature of this invention but the invention is not restricted to these examples. The parts are by weight.

Example 1

1 part of 1-amino-5-benzoylaminoanthraquinone is heated with 1,2 parts of 1,2-benzanthraquinone-Bz4-carboxylic acid chloride (prepared from Bz4-brom-1,2-benzanthraquinone by conversion into Bz4-cyan-1,2-benzanthraquinone by means of cuprous cyanide, saponification of the nitrile and treatment of the carboxylic acid with thionyl chloride, the resulting carboxylic acid chloride crystallizing from ortho-dichlorbenzene in the form of olive yellow needles) slowly to about 200° C. in 20 parts of nitrobenzene and kept at the said temperature until the formation of dyestuff is completed. The dyestuff separates in the form of a pale brown crystalline powder and forms yellow needles when crystallized from nitrobenzene. It dyes cotton very fast clear yellow shades from a yellowish red vat.

If the 1,2-benzanthraquinone-Bz4-carboxylic acid chloride be replaced by 6-chlor-1,2-benzanthraquinone-Bz4-carboxylic acid chloride prepared in an analogous manner from 6-chlor-Bz4-brom-1,2-benzanthraquinone (obtainable by brominating 6-chlor-1,2-benzanthraquinone and crystallizing in the form of yellow needles from nitrobenzene), a dyestuff which is very similar to that already described is obtained.

Example 2

1 part of 1,2-benzanthraquinone-Bz4-carboxylic acid is suspended in 20 parts of nitrobenzene and heated, after an addition of 1 part of thionyl chloride, to about 120° C. until the evolution of hydrogen chloride has ceased. The excess of thionyl chloride is distilled off, 1.2 parts of 1-amino-5-benzoylaminoanthraquinone are added and the whole is heated to about 200° C. and kept at the said temperature until the formation of dyestuff is completed. The separating dyestuff is identical with that obtained according to Example 1.

Example 3

1 part of 1,5-diaminoanthraquinone and 3.5 parts of 1,2-benzanthraquinone-Bz4-carboxylic acid chloride are slowly heated to boiling in 45 parts of nitrobenzene and the reaction mixture is kept at the boiling temperature for 5 hours. Di-(1,2-benzanthraquinone-Bz4-carboxyl)1,5-diaminoanthraquinone separates out in the form of a pale brown powder. It crystallizes from large quantities of nitrobenzene in the form of granular yellow crystals. The dyestuff dyes cotton brilliant yellow shades from a wine-red vat.

Other solvents of high boiling point, as for example naphthalene or diphenyl ether may be employed instead of nitrobenzene.

By starting from 1,8-diaminoanthraquinone instead of from 1,5-diaminoanthraquinone a very similar dyestuff is obtained.

*Example 4*

1 part of 1,5-dichloranthraquinone, 2.5 parts of 1,2 - benzanthraquinone - Bz4 - carboxylic acid amide, 1 part of anhydrous potash, 0.17 part of copper powder and 0.17 part of copper acetate are heated to 240° C. for several hours in 45 parts of alpha-nitronaphthalene. After cooling, the reaction mixture is diluted with ethyl alcohol. The dyestuff is freed from more readily soluble by-products, when necessary, by boiling with glacial acetic acid. It is identical with the dyestuff obtained according to Example 3.

*Example 5*

1 part of 1-chlor-5-benzoylaminoanthraquinone, 1 part of 1,2-benzanthraquinone-Bz4-carboxylic acid amide, 0.45 part of potash, 0.07 part of copper powder and 0.07 part of copper acetate are heated to 240° C. in 25 parts of diphenyl ether for several hours and then worked up as described in Example 4. The dyestuff is identical with that prepared according to Example 1.

*Example 6*

1 part of 1-aminoanthraquinone is slowly heated to 190 to 200° C. in 30 parts of nitrobenzene with 1.42 parts of 1,2-benzanthraquinone-Bz4-carboxylic acid chloride, the reaction mixture being kept at the said temperature until the formation of the dyestuff is complete. The reaction product is worked up in the usual manner. It dyes cotton from a yellowish red vat greenish yellow shades.

*Example 7*

1.42 parts of 1,2-benzanthraquinone-Bz-carboxylic acid chloride (which is obtainable by condensing β-naphthonitrile with phthalic anhydride, saponifying the obtained 1,2-benzanthraquinone-Bz-nitrile with sulphuric acid and converting the formed carboxylic acid in a known manner into the acid chloride, and which is considered to be 1,2-benzanthraquinone-Bz-2-carboxylic acid chloride or 1,2-benzanthraquinone-Bz-3-carboxylic acid chloride) are heated with 1 part of α-aminoanthraquinone in 30 parts of nitrobenzene up to 130° C. which temperature is maintained until the formation of the dyestuff is completed. The latter is worked up in the usual manner. It forms a red vat from which it dyes greenish yellow shades.

*Example 8*

1.2 parts of 1,2-benzanthraquinone-Bz-carboxylic acid chloride (obtained in the manner described in Example 7) are slowly heated together with 1 part of 1-amino-5-benzoylaminoanthraquinone in 25 parts of nitrobenzene up to 140° C. which temperature is maintained until the formation of the dyestuff is complete. The latter is worked up in the usual manner. It forms a red vat from which it dyes clear reddish yellow shades.

What we claim is:

1. Vat dyestuffs of the anthraquinone series corresponding to the general formula

R—CO—NH—R' in which R' stands for an anthraquinone radicle which may be substituted by a benzoylamino group and R for a 1,2-benzanthraquinone radicle in which the linkage to the —CO— group indicated in the formula is fixed to the Bz-nucleus, the remaining positions of the said benzanthraquinone radicle bearing atoms selected from the group consisting of hydrogen and halogen.

2. Vat dyestuffs of the anthraquinone series corresponding to the general formula

R—CO—NH—R' in which R' stands for an anthraquinone radicle and R for a 1,2-benzanthraquinone radicle in which the linkage to the —CO— group indicated in the formula is fixed to the Bz-nucleus, the remaining positions of the said anthraquinone radicle being saturated by substitutents selected from the class consisting of hydrogen, amino and acylated amino groups and the remaining positions of the said benzanthraquinone radicle bearing atoms selected from the group consisting of hydrogen and halogen.

3. Vat dyestuffs of the anthraquinone series corresponding to the general formula

R—CO—NH—R' in which R' stands for an anthraquinone radicle which may be substituted by a benzoylamino group and R for a 1,2-benzanthraquinone radicle in which the linkage to the —CO— group indicated in the formula is fixed to the Bz4-position, the remaining positions of the said anthraquinone radicle being saturated by substituents selected from the class consisting of hydrogen, amino and acylated amino groups and the remaining positions of the said benzanthraquinone radicle bearing atoms selected from the group consisting of hydrogen and halogen.

4. Vat dyestuffs of the anthraquinone series corresponding to the general formula

R—CO—NH—R' in which R' stands for an anthraquinone radicle bound in an alpha-position and R for a 1,2-benzanthraquinone radicle in which the linkage to the —CO— group indicated in the formula is fixed to the Bz-nucleus, the remaining positions of the said anthraquinone radicle being saturated by substituents selected from the class consisting of hydrogen, amino and acylated amino groups and the remaining positions of the said benzanthraquinone radicle bearing atoms selected from the group consisting of hydrogen and halogen.

5. The vat dyestuff corresponding to the formula:

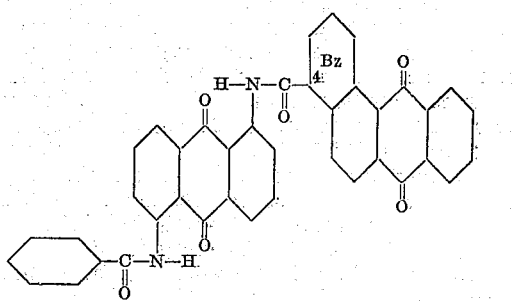

which dyestuff forms yellow needles when crystallized from nitrobenzene and dyes cotton yellow shades from a yellowish red vat.

6. The vat dyestuff corresponding to the formula:
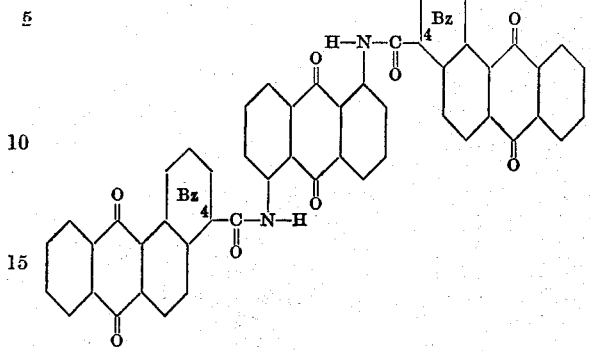
which dyestuff crystallizes in yellow crystals from nitrobenzene and dyes cotton yellow shades from a wine-red vat.
7. The vat dyestuff corresponding to the formula:
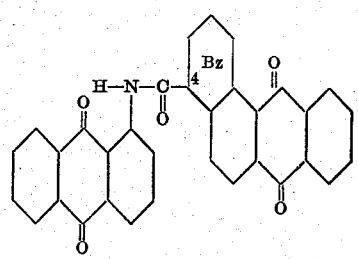
which dyestuff dyes cotton greenish yellow shades from a yellowish red vat.
HEINRICH NERESHEIMER.
WILHELM RUPPEL.
ANTON VILSMEIER.